April 4, 1950  E. L. MAYO  2,502,871
AUTOMOBILE HEATING AND VENTILATING SYSTEM
Filed May 20, 1946  4 Sheets-Sheet 1
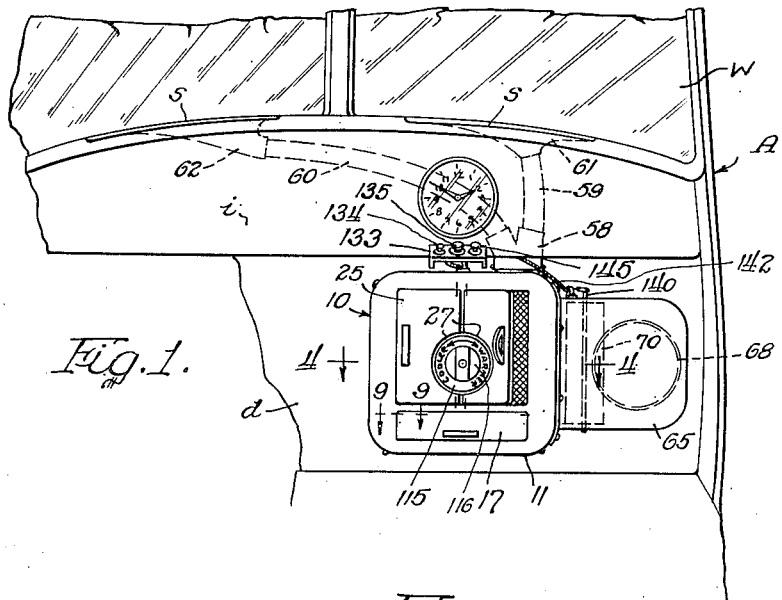
Fig. 1.
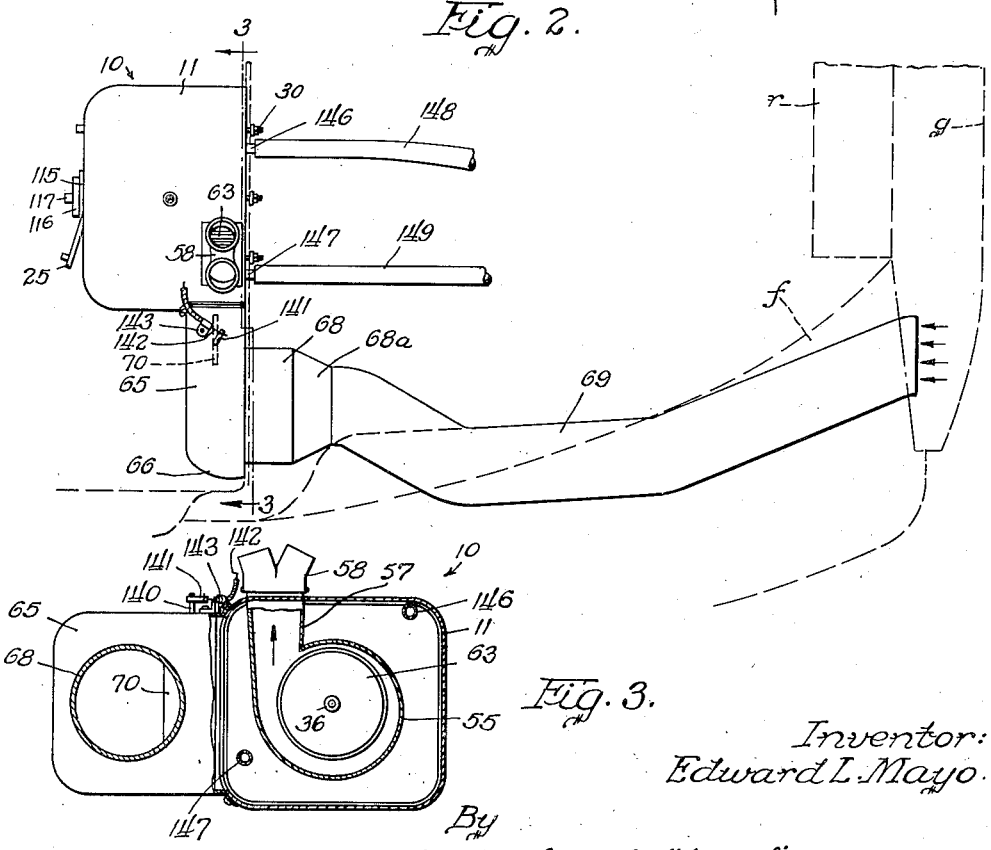
Fig. 2.
Fig. 3.
Inventor:
Edward L. Mayo.
By
Brown, Jackson, Boettcher + Dienner.
Attys.

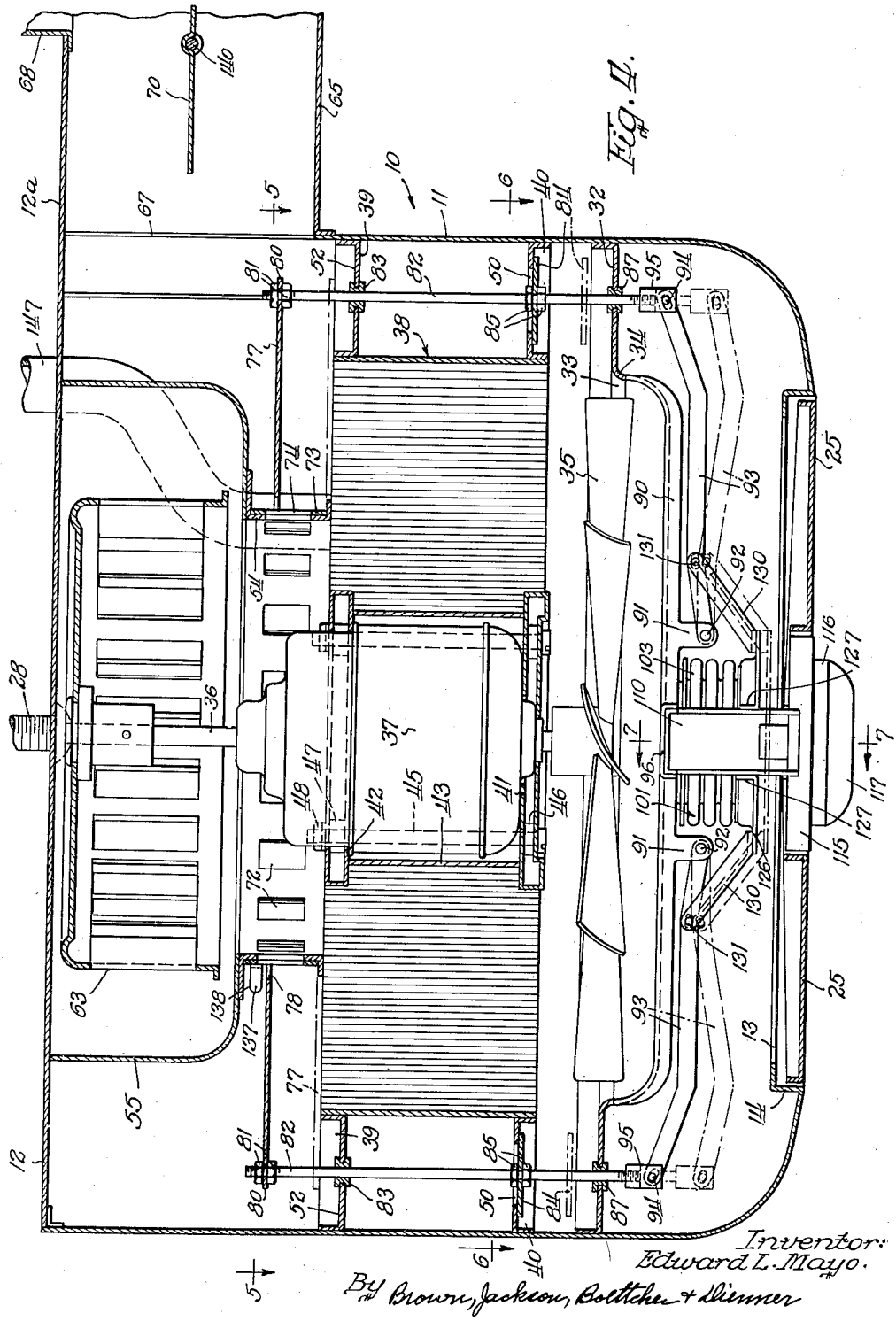

April 4, 1950 E. L. MAYO 2,502,871
AUTOMOBILE HEATING AND VENTILATING SYSTEM
Filed May 20, 1946 4 Sheets-Sheet 3
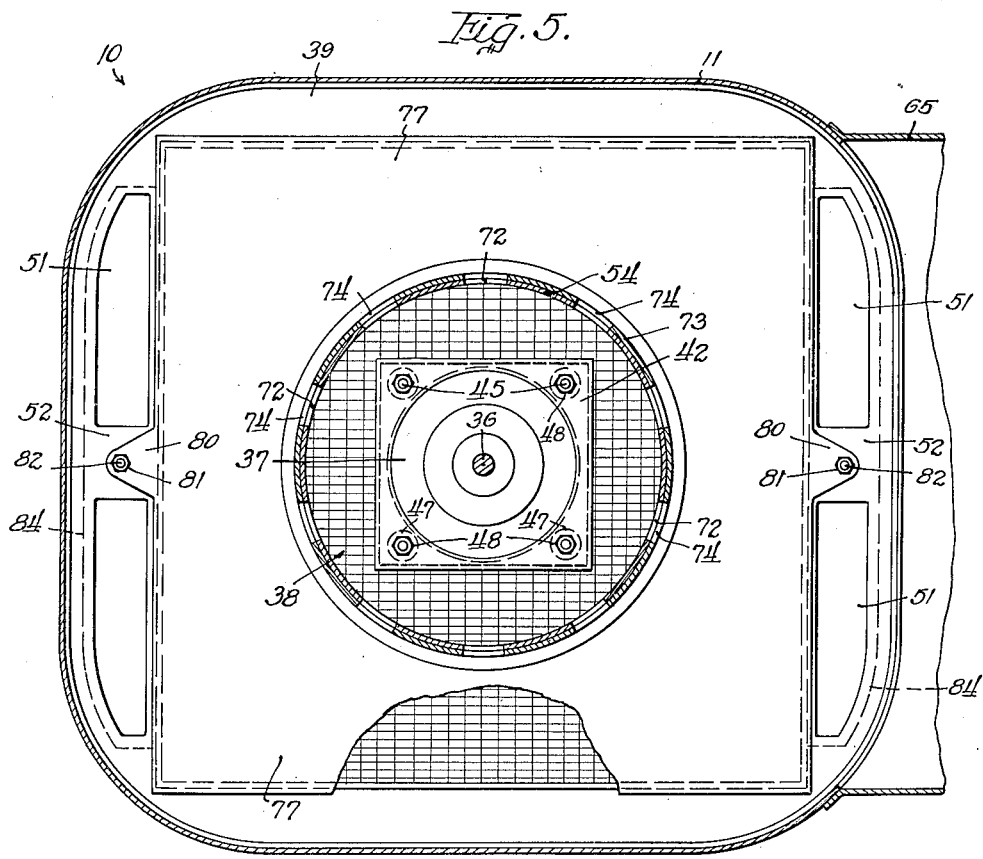
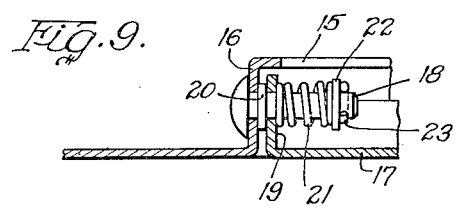
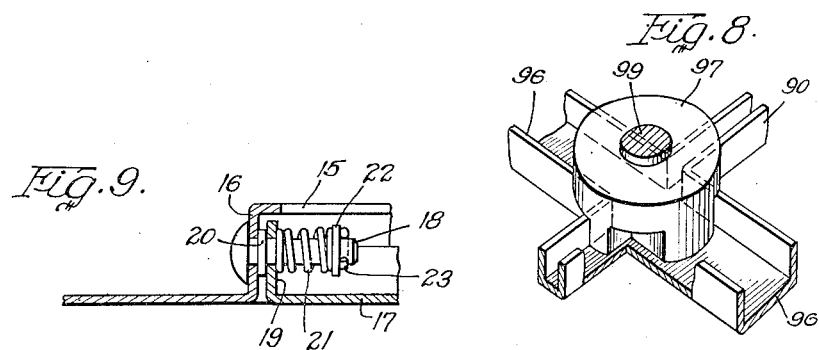
Inventor:
Edward L. Mayo.
By Brown, Jackson, Boettcher & Dienner
Attys.

April 4, 1950        E. L. MAYO        2,502,871
AUTOMOBILE HEATING AND VENTILATING SYSTEM
Filed May 20, 1946        4 Sheets-Sheet 4
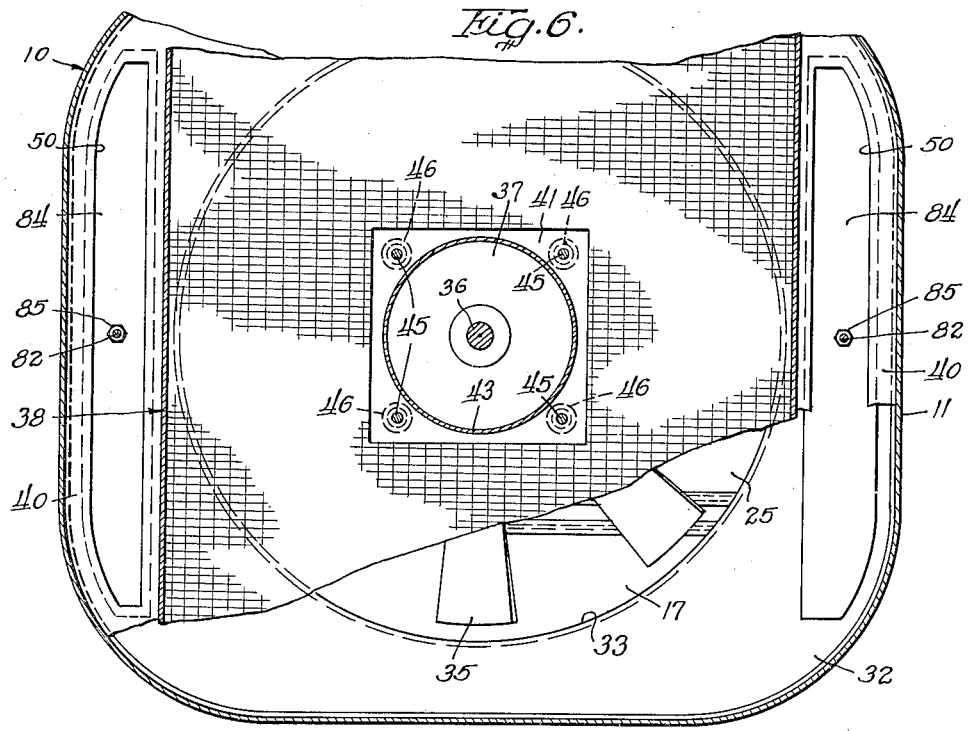
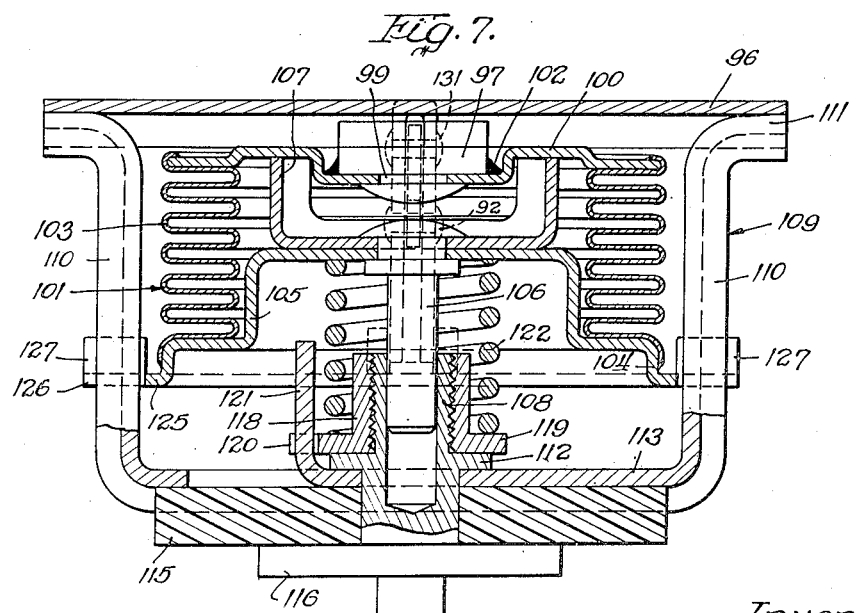
Inventor:
Edward L. Mayo.
By Brown, Jackson, Boettcher + Dienner
Attys.

Patented Apr. 4, 1950

2,502,871

UNITED STATES PATENT OFFICE 2,502,871

AUTOMOBILE HEATING AND VENTILATING SYSTEM

Edward L. Mayo, Cleveland, Ohio, assignor to The Bishop & Babcock Manufacturing Company, Cleveland, Ohio, a corporation of Ohio Application May 20, 1946, Serial No. 670,937

16 Claims. (Cl. 237—8)

This invention relates to automobile heating means, and has to do with a heater and a heating and ventilating system associated therewith.

Automobile heaters are well known and extensively used. It is known to provide heaters having blowers or fans whereby the air is recirculated within the body of the automobile so as to be passed through the core of the heater, through which hot water from the cooling system is circulated for heating the air, a portion of the heated air being directed through suitably disposed ducts and nozzles by which it is directed against the windshield for defrosting the same. In the use of such heaters but little, if any, fresh air is supplied to the interior of the automobile body. The air, in general, is simply recirculated and tends to become fouled, which is objectionable for obvious reasons, particularly if exhaust gases from the engine find their way into the automobile body.

My invention is directed to a heating and ventilating system embodying a heater and means whereby fresh air, that is, air taken from the outside of the automobile body, is continuously supplied to the air propelling means of the heater. I provide means whereby the fresh air which enters the heater may be caused to pass in part through the core, so as to be heated thereby, and in part around the core, the heated air and the unheated air being mixed and discharged from the heater into the automobile body. The means for supplying air to the heater also comprises means whereby the ratio of heated air to unheated air may be varied automatically so as to maintain a substantially constant desired predetermined temperature within the automobile body. Further, during warm weather or under conditions where heating of the entering air is not required, or is not desired, the air supplied to the heater may be passed in its entirety around the core so as not to be heated thereby to any appreciable extent, if at all, the heater then serving as a portion of a ventilating system by means of which fresh unheated air is continuously supplied to the interior of the automobile body. In addition, I provide means whereby heated air may be directed against the windshield for defrosting the latter, and the temperature of such air may be regulated as desired, or as conditions may require, by mixing therewith relatively cold unheated outside air.

Further objects and advantages of my invention will appear from the detail description.

In the drawings:

Figure 1 is a front view of the heater and associated parts of the heating and ventilating system of my invention as applied to an automobile, the windshield and instrument panel and adjacent portions of which are shown fragmentarily;

Figure 2 is a semi-diagrammatic plan view of the heating and ventilating system, including the heater, of Figure 1, the related portions of the automobile being indicated in dotted lines;

Figure 3 is a sectional view taken substantially on line 3—3 of Figure 2;

Figure 4 is a sectional view of the heater, on an enlarged scale, taken substantially on line 4—4 of Figure 1, certain parts being shown in plan;

Figure 5 is a sectional view taken substantially on line 5—5 of Figure 4, on a reduced scale;

Figure 6 is a sectional view taken substantially on line 6—6 of Figure 4, on a reduced scale, certain parts being shown in elevation and partly broken away;

Figure 7 is a sectional view, on an enlarged scale, taken substantially on line 7—7 of Figure 4, certain parts being shown in elevation;

Figure 8 is an isometric detail view of the block and associated parts for mounting the inner head of the thermostat; and Figure 9 is a fragmentary sectional view taken substantially on line 9—9 of Figure 1, on an enlarged scale, certain parts being shown in elevation.

In Figures 1 and 2 I have shown the heating and ventilating system of my invention as applied to an automobile A having the usual dash $d$, instrument panel $i$, and windshield $w$, there being slots $s$ adjacent the lower edge of the windshield for directing thereagainst defrosting air. A heater 10 is mounted on dash $d$ beneath the panel $i$ in a suitable manner, as will be described more fully later. The heater 10 comprises a housing 11 of generally cubiform construction having a back wall 12 provided at one side with a lateral extension 12a, housing 11, including back wall 12, conveniently being formed of sheet metal. The front wall of housing 11 is shaped to provide an upper rectangular opening 13 defined by an inwardly offset flange 14 of angle cross section, as shown more clearly in Figure 4, and a lower opening 15 defined by an inwardly offset flange 16 of angle cross section (Figure 9), this lower opening being of substantially less height than the upper opening 13. The opening 15 is controlled by a closure member or door 17, conveniently formed of sheet metal and of channel section both lengthwise and transversely. Door 17 is pivoted to flange 16, at each upper corner, by a pivot pin 18 passing through flange 16 and flange 19 of door 17, with a spacer 20 disposed between the two flanges, there being a compression spring 21 mounted about pin 18 and confined between flange 19 and a washer 22 positioned on pin 18 by a cotter pin 23 secured through the latter. The springs 21, one at each end of door 17, and associated parts, provide a hinge mounting for door 17 whereby it may readily be moved into any desired position between fully open and fully closed positions, while also providing friction means for holding the door in adjustment and means for restraining the door and associated parts against objectionable looseness or rattling. The opening 13 is controlled by two doors 25, also conveniently formed of sheet metal and of channel section lengthwise and transversely, the doors 25 being mounted, at their inner corners, on flange 14 for movement about vertical axes into any desired position between fully open and fully closed positions, in the same manner as the door 17 is mounted on flange 16. As is shown more clearly in Figures 1 and 4, each of the doors 25 is provided, a short distance above its lower end and at its inner portion, with an arcuate notch or recess 27, for a purpose which will be explained later. It will be seen that the housing 11 is closed at its front, except as to the openings 13 and 15 controlled by the doors 25 and 17, and is also closed at its back by the back plate 12. Suitable mounting members, conveniently headed bolts 28, are secured to and extend through back wall or plate 12 of casing 11, these bolts also extending through dash $d$ for reception of nuts 30 and associated lock washers, providing means for mounting the housing 11 on the dash $d$. A frame member 32 of angle cross section and rectangular in shape is secured within housing 11, in any suitable manner, a short distance from the front thereof, fitting snugly therein. This member 32 is provided with a circular opening 33 defined by a forwardly extending arcuate flange 34. Opening 33 receives a multiple bladed fan or blower 35 of known type, for impelling air forwardly of housing 11, this fan being of the axial discharge type, that is, impelling the air generally axially of the fan. Fan 35 is suitably secured on shaft 36, as is shown more clearly in Figure 4, of a suitable electric motor 37. This motor 37 is mounted coaxially of opening 33 and centrally of a heating core 38, of known construction, supported within housing 11 by supporting members 39 and 40 of channel cross section, fitting snugly within housing 11, spaced apart from front to back thereof and secured therein in any suitable known manner. Conveniently, the motor 37 is mounted by means of suitably formed mounting frames 41 and 42 fitting thereabout and spaced apart by a spacing member or sleeve 43, the frames 41 and 42 being of generally rectangular shape, as shown in Figures 5 and 6, and seating in corresponding recesses in the opposite faces of core 38. Tie bolts 45 pass through the frames 41 and 42, and through suitably disposed spacers 46 and 47 therein, these bolts receiving nuts 48 and, in cooperation therewith, clamping the frames 41 and 42 in position within core 38 and about the motor 37. Any other suitable means may be provided for mounting the motor, within the broader aspects of my invention.

The supporting member 40 is provided, at each side of core 38, with an elongated opening 50 extending the major portion of the height of core 38, and the supporting member 39 is provided with two openings 51, shown more clearly in Figure 5, together extending the major portion of the height of core 38, these openings 51 being separated by a bridge element 52.

A cylindrical neck 54, of channel cross section, extends from the inner or rearward face of core 38 in concentric spaced relation to motor 37 and is secured, at its rearward end, to a spiral casing 55 closed at its rearward end by wall or plate 12 of housing 11. The casing 55 is provided, adjacent one side thereof, with an upwardly extending neck 57, shown more clearly in Figure 3, which projects through the top wall of housing 11 and receives a two-armed fitting 58 suitably secured thereon. Two hose lengths 59 and 60 (Figure 1) are attached to the arms of fitting 58, at their lower ends, and are provided at their upper ends with suitably formed and disposed nozzles 61 and 62 for directing air through the slots $s$ against the windshield $w$. A centrifugal blower 63 of known type—that shown being a sirocco blower—is secured on shaft 36 of motor 37, within casing 55, for discharging air therefrom through neck 57 of fitting 58.

An elongated hood or cover 65, closed at its outer end at 66, (Figure 2) is mounted on extension 12a of back plate 12 of housing 11, with its open inner end seating against the side face of housing 11 about an opening 67 in the side wall of the housing. The hood 65 and extension 12a of plate 12 together constitute an air inlet passage for admitting air to housing 11 in rear of the core 38. An air inlet sleeve 68, suitably secured to extension 12a of plate 12, opens into the passage defined by hood 65, this sleeve having its rearward portion 68a tapered or of decreasing diameter rearward for connection to the rearward end of an air intake conduit 69, the forward end of which is disposed to one side of radiator $r$ of the automobile in back of grid $g$, as indicated in Figure 2. The open front end of conduit 69 preferably is suitably shaped to provide an air scoop to assure entry of an adequate amount of fresh air into conduit 69, particularly during travel of the automobile. In Figure 2 the conduit 69 is shown as extending in part beneath fender $f$ of the automobile and, if desired, may be formed in part by the fender. A damper 70, mounted in hood 65 for movement about a vertical axis, is provided for controlling the amount of air entering housing 11.

As is shown in Figure 4, the neck 54 overlies the central area of core 38 at the back thereof. This neck 54 is provided with opening 72 therein, and has mounted on its outer face a collar 73 likewise provided with spaced openings 74. The collar 73 is adjustable about neck 54, as will be explained more fully later, to move the openings 74 thereof into and out of register with openings 72 of neck 54, thus providing damper means for controlling entry of air into neck 54 and thence into casing 55, from in back of the core 38, this air being unheated. In the operation of the blower 63, air is drawn rearward through the core 38 into neck 54 and thence into casing 55, this air being drawn through the central area of the impeller fan or blower 35, as will be understood. Under certain conditions, which will be explained more fully presently, a portion of the air entering housing 11 through opening 67 thereof is caused to pass forwardly through the core 38 at the area thereof disposed outward beyond neck 54, so as to be heated by the core, and a portion of this heated air is then caused to flow rearward through the inner portion of core 38 into neck 54 and thence into casing 55, the air entering casing 55 being thus heated to a high temperature relative to the temperature of the air entering housing 11 through opening 67. By adjusting the collar 73, unheated air may be admitted in predetermined amount through the neck 54 into casing 55, this unheated air being mixed with the heated air drawn into casing 55 through neck 54 so that its temperature is reduced. In that manner, the air delivered by the blower 63 to the windshield for defrosting purposes may be tempered as desired or as conditions may require. On the other hand, if the air flowing to casing 55 is passed through the core 38 once only, from front to back thereof, the temperature of the air delivered to the windshield may likewise be controlled or tempered in the same manner.

A damper plate 77, of rectangular shape and having a central opening 78 adapted to fit about the flanged forward end of neck 54, as is shown more clearly in Figure 5, is disposed in back of core 38. The plate 77 is provided at each side thereof with a laterally projecting ear 80 through which is secured, by nuts 81, the rearward end portion of a damper rod 82. This rod 82 is slidable through a grommet 83 of suitable vibration damping material secured through bridge element 52 of the core supporting member 39. A second damper plate 84 is secured on each of the rods 82, in front of the core supporting member 40, by means of nuts 85. The plates 77 and 84 are so disposed that, when plate 77 is in its rearmost position away from core 38, the plates 84 are seated against the forward faces of member 40, effective for closing the openings 50 thereof, as shown in full lines in Figure 4, and when the plate 77 is in position at or against the rearward face of core 38 the plates 84 are disposed forwardly of member 40 uncovering the openings 50, as indicated in dot and dash lines in Figure 4. The damper rods 82 are also slidable through grommets 87 secured in the frame member 32 which, in conjunction with the grommets 83 and bridge elements 52, provide adequate means for supporting and guiding the rods 82 in the movement thereof.

From what has been said, it will be seen that when the damper plate 77 is in its rearmost position, the openings 50 of member 40 are closed, so that air entering housing 11 through opening 67 thereof is caused to flow forwardly of housing 11, by fan 35, so as to be drawn through the core 38 and heated thereby, this heated air being discharged through opening 13, or opening 15, if the doors 25 and 17 are open, these doors providing means for regulating the amount of air discharged from the heater into the automobile body, as will be understood. On the other hand, if the damper plate 77 is moved into its most forward position, seating against the rear face of core 38, the air entering housing 11 through opening 67 will flow between the core and the side walls of the housing and will not be heated to any appreciable extent, if at all, by the core 38. By suitable adjustment of the damper rods 82, the positions of the plates 77 and 84 may be adjusted so that a portion of the entering air passes through core 38 and a portion passes between this core and the side walls of the casing, the heated air and the unheated air being mixed by the fan 35 and discharged from housing 11. By proper adjustment of the rods 82 the ratio of the heated air to unheated air may be adjusted so that the temperature of the air discharged from the heater is maintained substantially at a desired predetermined value. When the damper plate 77 is away from the core 38, a portion of the heated air which has passed forwardly in the core at the area thereof outward beyond neck 54, is drawn back through the core at the area thereof corresponding to neck 54, the air entering neck 54 from core 38 being thus passed twice through the core so as to be heated thereby to a relatively high temperature. That is desirable in unusually cold weather. On the other hand, in moderate weather the damper plate 77, instead of being in its full open position, may be disposed at an intermediate position or in fully closed position, thereby reducing the amount of air passing forward through core 38 or even preventing passage of air through the core, so that the air passing through the core to neck 54 is heated to a correspondingly less degree than is the case when the damper plate 77 is in its full open or rearward position. The adjustability of the damper means associated with the core provides, in conjunction with the adjustable damper collar 73 controlling admission of unheated air to neck 54, highly flexible means for controlling within a considerable range the temperature of the air delivered to the windshield defrosting means.

I provide thermoresponsive means for automatically adjusting the core damper means as and for the purpose above described. A channel cross bar 90 (Figure 4) extends across opening 33 of frame member 32 at the center and horizontally thereof, the ends of this bar being welded or otherwise suitably secured to flange 34. Bar 90 is provided, at opposite sides of and equidistant from its center, with pairs of spaced ears 21 between which are pivoted, at 92, the inner ends of adjusting levers 93. The outer ends of levers 93 have pin and slot connections 94 to slotted heads 95 secured on the forward ends of damper rods 82. The channel bar 90 is further provided, at its midlength, and at opposite sides thereof, with vertical arms 96 of channel cross section providing, with the adjacent portions of bar 90, a cruciform structure, shown more clearly in Figure 8. A cylindrical block 97 has its inner or rearward portion suitably slotted for reception of the flanges of arms 96 and of bar 90, whereby this block is anchored to bar 90 and arms 96 so as to be restrained against relative translatory movement, as will be clear from Figure 8. Block 97 is provided, at its outer or forward end, with a stud 99 which passes through a central opening in the inner or rearward head 100 of a thermostat 101, stud 99 being headed over at the forward face of head 100 and securing block 97 thereto. As is shown more clearly in Figure 7, head 100 is centrally depressed or cupped for reception of block 97, which is further secured to the head by being soldered or welded thereto at 102. The thermostat 101 is of the bellows type and comprises a metal bellows 103 secured at one end to head 100 and, at the other end, to an outer or forward head 104. This head 104 has a rearwardly cupped portion 105 extending inward of bellows 103 to which is secured, by a suitably shouldered and headed guide pin 106, a U-shaped stop member 107 of channel cross section disposed to contact head 100 in the fully retracted or collapsed condition of the bellows 103. The thermostat is, of course, charged with a suitable thermosensitive fluid for causing outward or forward movement of head 104 responsive to increase in temperature above that at which the thermostat is in its fully retracted condition, as will be understood.

Pin 106 extends into and is slidable in a sleeve 108 passing through a U-shaped yoke 109, of channel cross section, having rearwardly extending arms 110 provided with terminal elements 111 seating in and welded or otherwise suitably secured to arms 96 extending from bar 90. Sleeve 108 is provided with an outer circumferential flange 112 seating against the inner or rearward face of the bight element 113 of yoke 109 and thereby restraining sleeve 108 against outward or forward movement relative to the yoke. Sleeve 108 is closed at its outer end and passes through a disc 115, formed of a plastic or any suitable material, having in its rearward face grooves receiving the flanges of bight element 113 of yoke 109 and defining a rib on disc 115 fitting snugly into bight element 113, disc 115 thus being restrained against turning movement relative to sleeve 108. A disc 116, also formed of plastic or any suitable material, is disposed at the forward face of disc 115 and is screwed or otherwise suitably fixed to the forward end of sleeve 108. Disc 116 is of substantially less diameter than disc 115, and is provided with a diametrical rib 117 forming a handle by means of which the disc 116 may readily be turned. Disc 115 is provided, at its forward face and at opposite sides thereof, with suitable legends, such as "Cooler" and Warmer," with associated arrows to indicate the directions in which disc 116 should be turned for decreasing and increasing the temperature of the air discharged from the heater, as will be explained more fully presently.

A thimble 118 is threaded onto sleeve 108 from the inner or rearward end thereof. This thimble 118 is provided, at its outer or forward end, with an outer circumferential flange 119 having a slotted extension 120 which receives a tongue 121 struck from bight element 113 of yoke 109 and extending rearward therefrom. This tongue 121 restrains thimble 118 against turning movement and also serves as a stop for positively limiting forward movement of head 105 of thermostat 101, as will appear more fully later. A compression coil spring 122 is disposed about guide pin 106 and thimble 118, this spring being confined between flange 119 of thimble 118 and the bellows head 105.

The bellows head 104 is of stepped cross section, as shown in Figure 7, having at its forward end an outwardly extending circumferential flange 125 provided with diametrically opposite notches 126 which receive the arms 110 of yoke 109. In forming the notches 126, the metal of flange 125 is slit and is bent rearward at opposite sides of the slit to provide guide flanges 127 which, in cooperation with the flanges of arms 110, serve to guide head 104 in its forward and rearward movements and to prevent any objectionable tilting or play thereof. Two arms 130, shown more clearly in Figure 4, of channel cross section for the major portion of their length, are welded or otherwise suitably secured to flange 125 of the bellows head 104, at diametrically opposite points thereof, these arms 130 being disposed in a plane perpendicular to the plane of arms 110 of yoke 109, that is, in a horizontal plane. Arms 130 extend at an inclination rearward from flange 125 and, at their rearward ends, straddle the operating levers 93, to which they are connected by pin slot connections 131.

From what has been said, it will be seen that when the thermostat 101 is subjected to relatively low temperatures, the bellows head 104 is moved rearward by the compression spring 122, so that the arms 93 are swung rearward, thus moving the damper plate 84 toward the core supporting member 40 and the damper plate 77 rearward away from core 38. That decreases the air flow about the sides of core 38 with corresponding increase in air flow through the area of the core extending outward beyond neck 54. When the head 104 reaches its rearmost position shown in Figure 7, damper plates 84 are seated against the core supporting member 40, closing the ports or opening 50 therein, and the damper plate 77 is disposed in its rearwardmost position away from core 38. That prevents air flow about the sides of core 38, so that the air entering housing 11 through opening 67 is all caused to flow through the area of core 38 extending outward beyond neck 34, except such portion of the air as may be drawn into the neck 54 through openings 72 thereof and openings 74 of damper collar 73. Under such conditions, all of the air discharged from the heater into the automobile body is passed through core 38 and heated thereby, the heater then functioning at its maximum heating capacity. If the damper collar 73 be in open position, either partially or fully open, a certain amount of the entering unheated fresh air will be drawn into neck 54 and there mixed with the heated air drawn into the neck through the corresponding area of core 38. In that connection, the heated air drawn into neck 54 will have been passed twice through core 38, as previously explained, so as to be heated thereby to a relatively high temperature. Since the thermostat is located coaxially with fan 35, it is disposed at the central or inactive portion of this fan, through which portions of core 38 air is drawn rearward threof by means of the blower 63. In general, therefore, the thermostat is subjected to air which has been heated and circulated through the body of the automobile and is, therefore, controlled by the temperature obtaining in the automobile body.

As will be understood, the arcuate notches or recesses 27 in the doors 25 accommodate the disc 115 so that these doors may be opened to desired extent for admitting air from the heater to the interior of the automobile body. The amount of air discharged from the heater may be controlled by the doors 25 and 17, the latter serving to direct the air downward when desired, as will be understood. The thermostat is responsive to the temperature in the automobile body, as noted, and when the temperature tends to exceed a desired value the bellows 101 of the thermostat expands, thus operating the damper plates 84 and 77 so as to vary the ratio of air passing through core 38 to air passing about the sides of the core. In that manner, the ratio of heated fresh air to unheated fresh air is maintained such that the desired temperature is also maintained, while assurance is had that the interior of the automobile body is at all times supplied with fresh air taken from the exterior thereof, which is conducive to comfort, as well as health and safety of the occupants of the automobile. By turning the disc 116, thimble 118 may be threaded, either rearward or forward, along sleeve 108 for varying the compression of spring 122, thereby varying the setting of the thermostat for maintaining the temperature within the automobile at the desired value. As previously noted, the tongue 121 (Figure 7) provides a stop which limits forward movement of bellows head 104 to the position in which the damper plate 77 is seated against the rearward face of core 38, thereby avoiding subjecting the levers 93 and associated parts to objectionable stresses or strain, such as would result from forward movement of head 104 beyond that position.

The damper collar 73 may be adjusted in any suitable manner. Conveniently, a heater control bracket 133 is suitably mounted on the panel 9 above heater 10. The bracket 133 carries a suitable switch 134 which controls the circuit of motor 37. A knob 135, carried by bracket 133, is connected by a Bowden wire 137 (Figure 4) to an angle bracket 138 secured to collar 73. That provides convenient means whereby collar 73 may be turned to desired extent in either direction, as will be understood. The damper 70 (Figure 4) is mounted on a rod 140 which passes through the top wall of hood 65 and has its upper end portion bent to provide a crank 141, to which is secured a Bowden wire 142 anchored by a clip 143 to the top wall of hood 65. The other end of the Bowden wire 142 is attached to a knob 145 carried by bracket 133. It will be apparent that by adjusting damper 70 the volume of fresh air entering housing 11 of the heater may be controlled as desired or as conditions may require.

Within the broader aspects of my invention, the core 38 may be heated in any suitable manner. Preferably, as above noted, core 38 is heated by hot water circulated therethrough from the engine cooling system. To that end, core 38 is provided with suitable nipples 146 and 147 connected by hose lengths 148 and 149 to the engine cooling system (not shown) in a known manner. Suitable known means may be provided for shutting off flow of hot water to core 38, when it is desired to utilize the unit 10 for supplying fresh air to the interior of the automobile without heating of such air. The unit 10 then is utilized as an air supply and circulating means rather than as a heater, as will readily be understood, which may be desirable in certain cases.

As will be understood, changes in detail may be resorted to without departing from the field and scope of my invention, and I intend to include all such variations, as fall within the scope of the appended claims, in this application in which the preferred form only of my invention has been disclosed.

I claim:

1. In an automobile heater, a housing, a heating core in said housing, the latter having a by-pass around said core and means for admitting air in rear of said core, a positively driven axial discharge blower in front of said core discharging toward the front of said housing, a positively driven blower and a casing therefor communicating with the central area of said core at the back thereof effective for inducing air flow therethrough rearward thereof, a thermostat subject to air flowing rearward to said core incident to the operation of said second blower, and means actuated by said thermostat effective for increasing the air flow forward through said core and decreasing the air flow forward through said by-pass and vice versa responsive to decrease and increase in temperature of the air flowing rearward over said thermostat.

2. In an automobile heater, a housing, a heating core in said housing, the latter having a by-pass around said core and means for admitting air in rear of said core, an axial discharge blower in front of said core discharging toward the front of said housing, a blower and a casing therefor communicating with the central area of said core at the back thereof effective for inducing air flow therethrough rearward thereof, a thermostat in front of said first blower at the central area thereof subject to air flowing rearward to said core incident to the operation of said second blower, and means actuated by said thermostat effective for increasing the air flow forward through said core and decreasing the air flow forward through said by-pass and vice versa responsive to decrease and increase in temperature of the air flowing rearward over said thermostat.

3. In automobile heating and ventilating means, an automobile body, a heater discharging into said body comprising a housing and a heating core therein, said housing having means for admitting thereto in back of said core air from the exterior of said body and a by-pass around said core, a positively driven axial discharge blower in front of said core discharging toward the front of said housing, a positively driven blower and a casing therefor having a neck communicating with the central area of said core at the back thereof effective for inducing air flow therethrough rearward thereof, means for admitting to said neck air in regulated amount from the exterior of said housing and in back of said core, a thermostat in front of said first blower at the central area thereof subject to air flowing rearward to said core incident to the operation of said second blower, and means actuated by said thermostat effective for increasing the air flow forward through said core and decreasing the air flow forward through said by-pass and vice versa responsive to decrease and increase in temperature of the air flowing rearward over said thermostat.

4. In automobile heating and ventilating means, an automobile body, a heater discharging into said body comprising a housing and a heating core therein spaced from the back thereof, said housing having means for admitting thereto in back of said core air from the exterior of said body and a by-pass around said core, a positively driven axial discharge blower in front of said core discharging toward the front of said housing, a positively driven blower and a casing therefor in said housing in back of said core, said casing having a neck overlying the central area of said core at the back thereof and said second blower being effective for inducing air flow rearward through the central area of said core, said neck having radially disposed air admission openings therein, a damper collar having air admission openings therein adjustable on said neck for regulating admission of air thereto through the openings thereof, a thermostat in front of said first blower at the central area thereof subject to air flowing rearward to said core incident to the operation of said second blower, and means actuated by said thermostat effective for increasing the air flow forward through said core and decreasing the air flow forward through said by-pass and vice versa responsive to decrease and increase in temperature of the air flowing rearward over said thermostat.

5. In automobile heating and ventilating means, an automobile body, a heater comprising a housing opening at its front into said body and a heating core in said housing, said housing having means for admitting thereto in back of said core air from the exterior of said body and a bypass around said core, a blower casing in back of said core having an air intake neck overlying the central area of said core at the back thereof, a motor having a shaft extending through said core substantially centrally thereof, said shaft projecting forward beyond said core and rearward beyond said core through said neck and into said casing, an axial discharge blower secured on said shaft in front of and adjacent said core and extending a substantial distance radially outward beyond said neck, a blower secured on said shaft in said casing effective for inducing air flow rearward through the central areas of said first blower and said core, a thermostat in front of said core at the central area thereof and of said first blower exposed to air flowing rearward to said core incident to the operation of said second blower, and means actuated by said thermostat effective for increasing the air flow through said core and decreasing the air flow through said bypass and vice versa responsive to decrease and increase in temperature of the air flowing rearward over said thermostat.

6. In automobile heating and ventilating means, an automobile body, a heater comprising a housing opening at its front into said body and a heating core in said housing, said housing having means for admitting thereto in back of said core air from the exterior of said body and a bypass around said core, a blower casing in back of said core having an air intake neck overlying the central area of said core at the back thereof, a motor having a shaft extending through said core substantially centrally thereof, said shaft projecting forward beyond said core and rearward beyond said core through said neck and into said casing, an axial discharge blower secured on said shaft in front of and adjacent said core and extending a substantial distance radially outward beyond said neck, a radial discharge blower secured on said shaft in said casing effective for inducing air flow rearward through the central areas of said first blower and said core, a thermostat in front of said core at the central area thereof and of said first blower exposed to air flowing rearward to said core incident to the operation of said second blower, and means actuated by said thermostat effective for increasing the air flow through said core and decreasing the air flow through said bypass and vice versa responsive to decrease and increase in temperature of the air flowing rearward over said thermostat.

7. In automobile heating and ventilating means, an automobile body, a heater comprising a housing opening at its front into said body and a heating core in said housing, said housing having means for admitting thereto in back of said core air from the exterior of said body and a bypass around said core, a blower casing in back of said core having an air intake neck overlying the central area of said core at the back thereof, a motor having a shaft extending through said core substantially centrally thereof, said shaft projecting forward beyond said core and rearward beyond said core through said neck and into said casing, an axial discharge blower secured on said shaft in front of and adjacent said core and extending a substantial distance radially outward beyond said neck, a radial discharge blower secured on said shaft in said casing effective for inducing air flow rearward through the central areas of said first blower and said core, a thermostat in front of said first blower in substantial alignment with and adjacent the central area thereof exposed to air flowing rearward to said core incident to the operation of said second blower, and means actuated by said thermostat effective for increasing the air flow through said core and decreasing the air flow through said bypass and vice versa responsive to decrease and increase in temperature of the air flowing rearward over said thermostat.

8. In automobile ventilating and heating means, an automobile body, a heater comprising a housing opening at its front into said body and a heating core in said housing, said housing having means for admitting thereto in back of said core air from the exterior of said body and a bypass around said core, a motor mounted in said core substantially centrally thereof, a blower casing in back of said core having an air intake neck extending radially outward beyond said motor and overlying the central area of said core at the back thereof, said motor having a shaft projecting forward beyond said core and rearward beyond said core through said neck and into said casing, an axial discharge blower secured on said shaft in front of and adjacent said core and extending a substantial distance radially outward beyond said neck, a blower secured on said shaft in said casing effective for inducing air flow rearward through the central areas of said first blower and said core, a thermostat in front of said core at the central area thereof and of said first blower exposed to air flowing rearward to said core incident to the operation of said second blower, and means actuated by said thermostat effective for increasing the air flow through said core and decreasing the air flow through said bypass and vice versa responsive to decrease and increase in temperature of the air flowing rearward over said thermostat.

9. In automobile heating and ventilating means, an automobile body, a heater comprising a housing opening into said body and a core in said housing adapted for circulation therethrough of water from the automobile engine cooling system, an air supply conduit opening exteriorly of said body and into said housing, means for causing flow of air through said conduit and housing into said body, means for withdrawing air from within said body concomitantly with the inflow of air through said housing, and thermoresponsive means comprising damper means and a thermostat subject to the outflowing air and having mechanical operating connection to said damper means, the latter being effective for directing the inflowing air in part through said core and in part around said core in variable ratio whereby the air within said body is maintained substantially at a desired predetermined temperature.

10. In automobile heating and ventilating means, an automobile body, a heater comprising a housing opening into said body and a core in said housing adapted for circulation therethrough of water from the automobile engine cooling system, an air supply conduit opening exteriorly of said body and into said housing, positively driven blower means for causing flow of air through said conduit and housing into said body, supplementary means for withdrawing air from within said body during the operation of said blower means, and thermoresponsive means comprising damper means and a bellows thermostat subject to the outflowing air and having mechanical operating connection to said damper means, the latter being effective for directing the inflowing air in part through said core and in part around said core in variable ratio whereby the air within said body is maintained substantially at a desired predetermined temperature.

11. In automobile heating and ventilating means, an automobile body, a heater comprising a housing opening into said body and a core in said housing adapted for circulation therethrough of water from the automobile engine cooling system, an air supply conduit opening exteriorly of said body and into said housing, means for causing flow of air through said conduit into said housing in rear of said core and forwardly through said housing at areas thereof disposed outward from the central area of said core, means for withdrawing air from within said body through the central area of said core concomitantly with the forward flow of air through said housing, and thermoresponsive means comprising damper means and thermostat means subject to the outflowing air and having mechanical operating connection to said damper means, the latter being effective for directing the forwardly flowing air in part through said core and in part around said core in variable ratio whereby the air within said body is maintained substantially at a desired predetermined temperature.

12. In automobile heating and ventilating means, an automobile body, a heater comprising a housing opening into said body and a core in said housing adapted for circulation therethrough of water from the automobile engine cooling system, an air supply conduit opening exteriorly of said body and into said housing, positively driven blower means for causing flow of air through said conduit into said housing in rear of said core and forwardly through said housing at areas thereof disposed outward from the central area of said core, supplementary means for withdrawing air from within said body through the central area of said core concomitantly with the forward flow of air through said housing, and thermoresponsive means comprising damper means and a bellows thermostat subject to the air withdrawn from said body and having mechanical operating connection to said damper means, the latter being effective for directing the forwardly flowing air in part through said core and in part around said core in variable ratio whereby the air within said body is maintained substantially at a desired predetermined temperature.

13. In an automobile heater, a housing having a front air discharge opening, a core in said housing adapted for circulation therethrough of water from the cooling system of an automobile internal combustion engine, an air supply conduit open to the atmosphere and opening into said housing adjacent the rear thereof, means for causing flow of air through said conduit into said housing and forwardly through the latter at predetermined areas thereof, means for causing rearward flow of air through said housing at a predetermined area thereof concomitantly with said forward flow of air, and thermoresponsive means subject to the rearwardly flowing air stream effective for directing the forwardly flowing air in part through said core and in part around said core in variable ratio whereby the air of the space heated by said heater is maintained substantially at a desired predetermined temperature.

14. In an automobile heater, a housing having a front air discharge opening, a core in said housing adapted for circulation therethrough of water from the cooling system of an automobile internal combustion engine, an air supply conduit open to the atmosphere and opening into said housing adjacent the rear thereof, means for causing flow of air through said conduit into said housing and forwardly through the latter at areas thereof disposed outward from the central area of said core, means causing rearward flow of air through the central area of said core concomitantly with said forward flow of air, and means comprising a thermostat disposed in front of and in substantial alignment with the central area of said core subject to the rearwardly flowing air stream effective for directing the forwardly flowing air in part through said core and in part around said core in variable ratio whereby the air of the space heated by said heater is maintained substantially at a desired predetermined temperature.

15. In an automobile heater, a housing having a front air discharge opening, a core in said housing adapted for circulation therethrough of water from the cooling system of an automobile internal combustion engine, an air supply conduit open to the atmosphere and opening into said housing adjacent the rear thereof, blower means for causing flow of air through said conduit into said housing and forwardly through the latter at areas thereof disposed outward from the central area of said core while causing rearward flow of air through the central area of said core, damper means for directing the forwardly flowing air around said core and through said core, and control means for automatically adjusting said damper means and thereby directing the forwardly flowing air in part through said core and in part around said core in variable ratio for maintaining the air in the space heated by said heater substantially at a desired predetermined temperature, said control means comprising a thermostat disposed in front of and adjacent the central area of said core in the rearwardly flowing air stream.

16. In an automobile heater, a housing having a front air discharge opening, a core in said housing adapted for circulation therethrough of water from the cooling system of an automobile internal combustion engine, an air supply conduit open to the atmosphere and opening into said housing adjacent the rear thereof, blower means for causing flow of air through said conduit into said housing and forwardly through the latter at areas thereof disposed outward from the central area of said core while causing rearward flow of air through the central area of said core, damper means for directing the forwardly flowing air around said core and through said core, a thermostat disposed in front of and adjacent the central area of said core in the rearwardly flowing air stream, and mechanical connections between said thermostat and said damper means effective for adjusting the latter and thereby directing the forwardly flowing air in part through said core and in part around said core in variable ratio whereby the air of the space heated by said heater is maintained substantially at a desired predetermined temperature.

EDWARD L. MAYO.

REFERENCES CITED

The following references are of record in the file of this patent:

UNITED STATES PATENTS

| Number | Name | Date |
|---|---|---|
| 1,825,036 | Young | Sept. 29, 1931 |
| 2,103,835 | Van Vulpen | Dec. 28, 1937 |
| 2,310,941 | Dewey | Feb. 16, 1943 |
| 2,403,917 | Gille | July 16, 1946 |